United States Patent

Hassenrück et al.

Patent Number: 5,468,848
Date of Patent: Nov. 21, 1995

[54] BASIC AZO DYESTUFFS OF THE 3-CYANO-2,4,6-TRIAMINO PYRIDINE SERIES

[75] Inventors: Karin Hassenrück, Düsseldorf; Peter Wild, Odenthal, both of Germany

[73] Assignee: Bayer Aktiengesellschaft, Leverkusen, Germany

[21] Appl. No.: 263,329

[22] Filed: Jun. 21, 1994

[30] Foreign Application Priority Data

Jun. 28, 1993 [DE] Germany .......................... 43 21 422.3

[51] Int. Cl.⁶ .................... C09B 29/42; C09B 35/031; D06P 1/41; D21H 21/28
[52] U.S. Cl. .................... 534/759; 534/691; 534/760; 534/770; 534/773; 534/755; 8/657; 8/919
[58] Field of Search ........................ 534/770, 773, 534/759, 760, 604, 615, 606, 607; 8/654, 655, 657

[56] References Cited

U.S. PATENT DOCUMENTS

| | | | |
|---|---|---|---|
| 3,839,426 | 10/1974 | Jefferies et al. | 534/604 X |
| 3,899,478 | 8/1975 | Fleckstein et al. | 534/607 |
| 3,959,250 | 5/1976 | Heinrich et al. | 534/760 |
| 4,066,637 | 1/1978 | Ramanthan | 534/773 X |

FOREIGN PATENT DOCUMENTS

| | | | |
|---|---|---|---|
| 281920 | 9/1988 | European Pat. Off. | 534/606 |
| 2169872 | 9/1973 | France . | |
| 2263109 | 7/1973 | Germany . | |
| 2362581 | 6/1975 | Germany . | |
| 2418081 | 11/1975 | Germany | 534/604 |
| 1416739 | 12/1975 | United Kingdom . | |

*Primary Examiner*—Johann Richter
*Assistant Examiner*—Fiona T. Powers
*Attorney, Agent, or Firm*—Sprung Horn Kramer & Woods

[57] ABSTRACT

The new basic azo dyestuffs of the formula

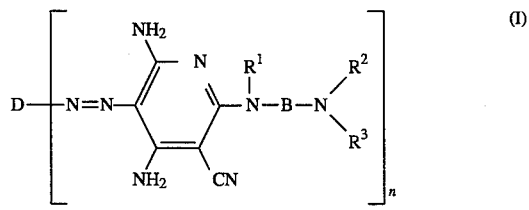

wherein the symbols have the meaning given in the description, are suitable for dyeing synthetic and naturally occurring substrates which can be dyed with basic dyestuffs.

6 Claims, No Drawings

BASIC AZO DYESTUFFS OF THE 3-CYANO-2,4,6-TRIAMINO PYRIDINE SERIES

The present invention relates to new basic azo dyestuffs, processes for their preparation and their use for dyeing synthetic and naturally occurring materials which can be dyed with basic dyestuffs. Basic azo dyestuffs of a similar structure which are suitable for dyeing and printing synthetic materials are already known from the prior art (compare DE-OS 22 63 109).

The new basic azo dyestuffs correspond to the general formula

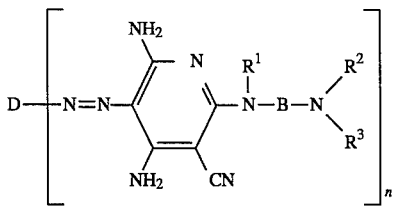 (I)

wherein
B represents a bridge member,
$R^1$ represents hydrogen, alkyl or aryl or
$R^1$ and $R^2$, together with B and the two nitrogen atoms to which they are bonded, form an optionally substituted 5- or 6-membered heterocyclic ring, and in this case B represents a direct bond, —$CH_2$— or —$CH_2CH_2$—,
$R^2$ and $R^3$ independently of one another represent hydrogen, alkyl, alkenyl or aralkyl or
$R^2$ and $R^3$, together with the nitrogen atom to which they are bonded, form an optionally substituted 5- or 6-membered heterocyclic ring,
n represents 1 or 2 and
D represents the radical of a diazo component of the formula

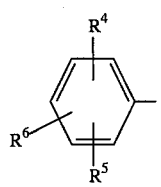

in the case where n represents 1, or
D represents the radical of a tetrazo component of the formula

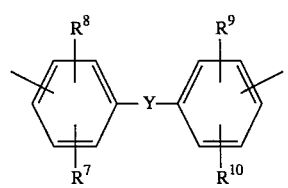

in the case where n represents 2,
wherein
$R^4$ and $R^5$ independently of one another represent hydrogen, $C_1$–$C_4$-alkyl, $C_1$–$C_4$-alkoxy, fluorine, chlorine, bromine, $SO_3H$ or NH—Ac,
Ac represents $C_1$–$C_4$-alkylcarbonyl, $C_1$–$C_4$-alkylsulphonyl, $C_1$–$C_4$-alkylcarbamoyl, benzoyl, toluoyl, phenylsulphonyl, tolylsulphonyl, phenylcarbamoyl, tolylcarbamoyl or optionally substituted triazinyl,
$R^6$ represents a radical of the formula

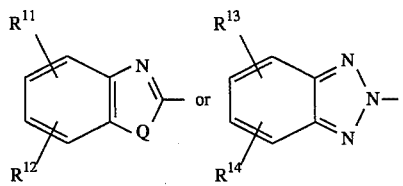

wherein
$R^7$–$R^{14}$ independently of one another represent hydrogen, $SO_3H$, $C_1$–$C_4$-alkyl, $C_1$–$C_4$-alkoxy, chlorine or bromine,
Q represents O, S or NH and
Y represents a direct bond or a bridge member,
and wherein the cyclic and acyclic radicals in turn can be substituted by radicals customary in dyestuffs chemistry.

Alkyl radicals are to be understood as meaning, in particular, those having 1–8 C atoms, and alkenyl radicals are to be understood as meaning those having 2–4 C atoms.

Substituents of the alkyl and aryl radicals are, for example, halogen, preferably fluorine, chlorine or bromine, hydroxyl, $C_1$–$C_4$-alkoxy, cyano, amino and mono- and di-$C_1$–$C_4$-alkylamino. The aryl radicals can additionally be substituted by $C_1$–$C_4$-alkyl. Aryl preferably represents $C_6$–$C_{10}$-aryl, preferably phenyl or naphthyl, in particular phenyl.

Aralkyl preferably represents benzyl or phenylethyl, which can be substituted, for example, in the phenyl nucleus by fluorine, chlorine, bromine, $C_1$–$C_4$-alkyl, $C_1$–$C_4$-alkoxy, nitro, cyano, amino and mono- and di-$C_1$–$C_4$-alkylamino.

Halogen in all the definitions preferably represents fluorine, chlorine or bromine.

Possible substituents for the cyclic and acyclic radicals are, for example, halogen, sulpho, hydroxyl, $C_1$–$C_4$-alkoxy, $C_1$–$C_4$-alkyl, cyano, amino or mono- or di-$C_1$–$C_4$-alkylamino.

B can be, for example: —$CH_2CH_2$—, —$CH_2CH_2CH_2$—, —$CH_2CH_2$—$NHCH_2CH_2$—,

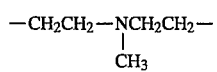

—$CH_2CH_2CH_2$—NH—$CH_2CH_2CH_2$—.

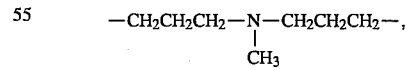

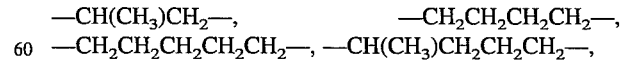

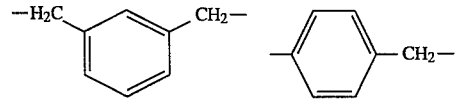

-continued

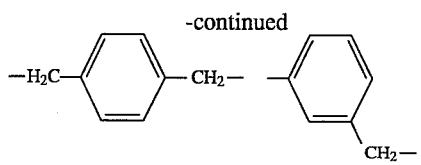

wherein the free bond on the phenyl radical is bonded to N—R².

example which my be mentioned of optionally substituted triazinyl in the definition of Ac is the radical

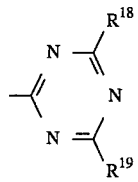

wherein

R¹⁸ and R¹⁹ independently of one another represent alkyl or aryl, preferably C₁–C₄-alkyl which is optionally substituted by hydroxyl, C₁–C₄-alkoxy, chlorine or bromine or phenyl which is optionally substituted by hydroxyl, C₁–C₄- alkoxy, chlorine, bromine or C₁–C₄-alkyl, or represent a radical of the formula

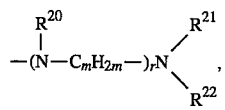

—O—R²³ or —S—R²⁴ wherein

R²⁰, R²¹, R²², R²³ and R²⁴ independently of one another represent hydrogen, alkyl, alkenyl, aryl, aralkyl or cycloalkyl, preferably hydrogen or C₁–C₄-alkyl or C₂–C₄-alkenyl, in each case optionally substituted by hydroxyl, halogen, cyano or C₁–C₄-alkoxy, or represent benzyl, phenylethyl, phenyl, naphthyl or cyclohexyl, in each case optionally substituted by halogen, C₁–C₄-alkyl, hydroxyl or C₁–C₄-alkoxy, or R²¹ and R²² , together with the N atom to which they are bonded, represent an optionally substituted 5- or 6-membered ring, preferably pyrrolidine, piperidine, morpholine or piperazine, in each case optionally substituted by C₁–C₄-alkyl, the external nitrogen atom of which in each case can be alkylated or quaternized by optionally OH— or NH₂-substituted C₁–C₄-alkyl, m represents 2 or 3 and r represents 0 or 1.

Substituents R¹⁸ and R¹⁹ which are to be mentioned in particular are: amino, methylamino, dimethylamino, ethylamino, diethylamino, 2-hydroxylethylamino, bis-(2-hydroxyethyl)-amino, allylamino, diallylamino, methoxyethylamino, sulphatoethylamino, carboxymethylamino, N-methyl-N-carboxymethylamino, carboxyethylamino, N-methyl-N-sulphomethylamino, sulphoethylamino, N-methyl-N-sulphoethylamino, cyclohexylamino, pyrrolidino, piperidino, 1-methylpiperazino, 1-(β-aminoethyl-)piperazine, 1-(3-hydroxyethyl-)piperazine, morpholino, 4-morpholinamino, benzylamino, and optionally substituted phenyl- or naphthylamino.

Possible bridge members Y are, preferably: —CO—NH—, —CO—, —NH—CO—NH—, —CH₂—CH₂—, —CH=CH—, —CH₂—, —C(CH₃)₂—,

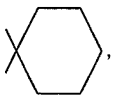

—O—, —S—, —NH—,

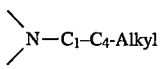

—N=N—,   —NH—CO—CH=CH—CO—NH—,
—NH—CO—CH₂—CH₂—CO—NH— and

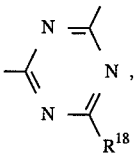

wherein

R¹⁸ has the abovementioned meaning.

Preferred dyestuffs of the formula (I) are those wherein

R¹ represents hydrogen, or represents C₁–C₄-alkyl which is optionally substituted by halogen, hydroxyl, C₁–C₄-alkoxy, cyano, amino or mono- or di-C₁–C₄-alkylamino, or represents C₆–C₁₀-aryl which is optionally substituted by halogen, C₁–C₄-alkyl or C₁–C₄-alkoxy, R² and R³ independently of one another represent hydrogen, or represent C₁–C₄-alkyl or C₃- or C₄-alkenyl, in each case optionally substituted by hydroxyl, C₁–C₄-alkoxy, chlorine, bromine or cyano, or represent benzyl or phenylethyl, which are in each case optionally substituted by hydroxyl, C₁–C₄-alkoxy, chlorine, bromine, cyano or C₁–C₄-alkyl, or R¹ and R², together with B and the two nitrogen atoms to which they are bonded,
a) in the case where B represents a direct bond, form a hexahydropyridazine ring which is optionally substituted by C₁–C₄-alkyl,
b) in the case where B represents —CH₂—, form a hexahydropyrimidine ring which is optionally substituted by C₁–C₄-alkyl or
c) in the case where B represents —CH₂CH₂—, form a piperazine ring which is optionally substituted by C₁–C₄-alkyl, or R² and R³, together with the nitrogen atom to which they are bonded, form a pyrrolidine, piperidine, morpholine, hexahydropyridazine, hexahydropyrimidine or piperazine ring which is optionally substituted by C₁–C₄-alkyl, the C₁–C₄-alkyl substituents optionally being substituted by chlorine, bromine, hydroxyl, cyano, amino or mono- or di-C₁–C₄-alkylamino, and B represents C₂–C₅-alkylene which is optionally interrupted by —O—, —S— or

wherein

R represents hydrogen, or represents $C_1$–$C_4$-alkyl which is optionally substituted by chlorine, bromine, hydroxyl, cyano, $C_1$–$C_4$-alkoxy, amino and mono- and di-$C_1$–$C_4$-alkylamino, or represents $C_6$–$C_{10}$-aryl which is optionally substituted by fluorine, chlorine, bromine, $C_1$–$C_4$-alkyl or $C_1$–$C_4$-alkoxy, or B represents a radical of the formula

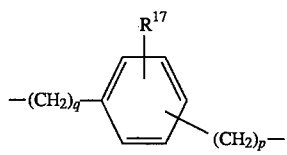

wherein q represents 0, 1, 2 or 3, p represents 1, 2 or 3, $(CH_2)_p$ is bonded to the radical $NR^2R^3$ and $R^{17}$ represents hydrogen, $C_1$–$C_4$-alkyl, $C_1$–$C_4$-alkoxy, chlorine or bromine.

Particularly preferred dyestuffs of the formula (I) are those wherein $R^1$ represents hydrogen, $R^2$ and $R^3$ independently of one another represent $C_1$–$C_4$-alkyl, β- or γ-hydroxy-$C_2$–$C_4$-alkyl or benzyl, or $R^2$ and $R^3$, together with the nitrogen atom to which they are bonded, form a pyrrolidine, morpholine, piperidine or piperazine ring, the terminal nitrogen atom of which can additionally be substituted by β-hydroxyethyl, B represents —CH$_2$CH$_2$—, —CH$_2$CH$_2$CH$_2$—, —CH(CH$_3$)CH$_2$— or —CH$_2$CH$_2$CH$_2$CH$_2$—, D represents a radical of the formula

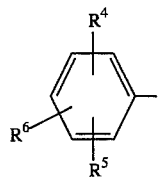

and n represents 1, $R^4$ represents hydrogen, methoxy, ethoxy, methyl, ethyl, fluorine, chlorine, bromine or NH—Ac, Ac represents acetyl or benzoyl or represents optionally substituted triazinyl, $R^5$ represents hydrogen, fluorine, chlorine, bromine, methoxy, ethoxy, SO$_3$H, methyl or ethyl and $R^6$ represents a radical of the formula

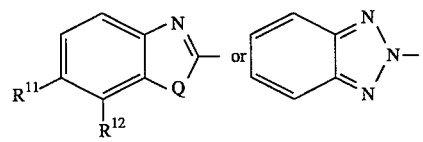

wherein $R^{11}$ and $R^{12}$ independently of one another represent hydrogen, fluorine, chlorine, bromine, methoxy, ethoxy, SO$_3$H, methyl or ethyl and Q represents O, S or NH.

Dyestuffs of the formula (I) which are likewise particularly preferred are those wherein $R^1$ represents hydrogen, $R^2$ and $R^3$ independently of one another represent $C_1$–$C_4$-alkyl, β- or γ-hydroxy-$C_2$–$C_4$-alkyl or benzyl or $R^2$ and $R^3$, together with the nitrogen atom to which they are bonded, form a pyrrolidine, morpholine, piperidine or piperazine ring, the terminal nitrogen atom of which can additionally be substituted by β-hydroxyethyl, B represents the formula —CH$_2$CH$_2$—, —CH$_2$CH$_2$CH$_2$—, —CH(CH$_3$)CH$_2$— or —CH$_2$CH$_2$CH$_2$CH$_2$—, D represents a radical of the formula

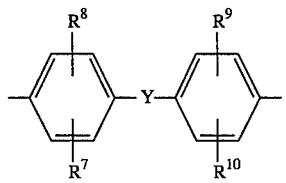

and n represents 2,

Y represents —CO—NH—, —CO—, —NH—CO—NH—, —CH$_2$—CH$_2$—, —CH=CH—, —CH$_2$—, —C(CH$_3$)$_2$—,

—O—, —S—, —NH—,

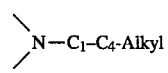

—N=N—, —NH—CO—CH=CH—CO—NH—, —NH—CO—CH$_2$—CH$_2$—CO—NH— or

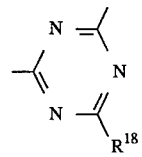

wherein $R^{18}$ represents alkyl or aryl, preferably $C_1$–$C_4$-alkyl which is optionally substituted by hydroxyl, $C_1$–$C_4$-alkoxy, chlorine or bromine or phenyl which is optionally substituted by hydroxyl, $C_1$–$C_4$-alkoxy, chlorine, bromine or $C_1$–$C_4$-alkyl, or represents a radical of the formula

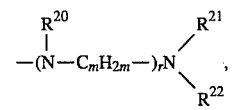

—O—$R^{23}$ or —S—$R^{24}$ wherein m represents 2 or 3, r represents 0 or 1 and

R²⁰, R²¹, R²² and R²³ independently of one another represent hydrogen, alkyl, alkenyl, aryl, aralkyl or cycloalkyl, or R²¹ and R²¹, together with the N atom to which they are bonded, form a 5- or 6-membered ring and R⁷–R¹⁰ independently of one another represent hydrogen, SO₃H, C₁–C₄-alkyl, C₁–C₄-alkoxy, chlorine or bromine.

The dyestuffs of the general formula (I) can be prepared in a manner which is known per se by diazotization of the amines of the formula $$D\text{—}(NH_2)_n \qquad (II)$$

wherein

D and n have the abovementioned meaning, and coupling of the product with the compounds of the formula

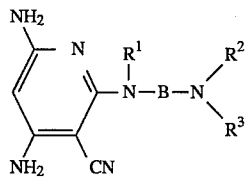

(III)

wherein

R¹, R², R³ and B have the abovementioned meaning.

The compounds of the formula (III) can be prepared in a manner which is known per se by reaction of the amines of the formula

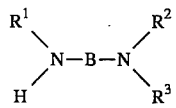

(IV)

wherein

R¹, R², R³ and B have the abovementioned meaning, with compounds of the formula

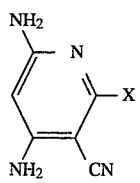

(V)

wherein

X represents bromine or chlorine.

The compounds of the formulae (II), (IV) and (V) are generally known in organic chemistry.

The diazotization of the mines (II) is in general carried out in a known manner at temperatures of between 0° and 50° C., it being possible to use, for example, the following monoaminobenzenes:

2-(4'-aminophenyl)-benzothiazole, 2-(4'-aminophenyl) -6-methylbenzothiazole, 2-(4'-amino-3'-methylphenyl) -4,6-dimethylbenzothiazole, 2-(4'-aminophenyl)-benzimidazole, 2-(4'-aminophenyl)-benz-oxazole, 2-(4'-aminophenyl)-benzothiazole, 2-(4'-amino-3'-methylphenyl) -benzothiazole, 2-(4'-amino-3'-methoxyphenyl) -benzotriazole, 2-(4'-aminophenyl)-5-methylbenzothiazo, 4-aminoazobenzene, 4-amino-2,3'-dimethylazobenzene, 4-amino-benzanilide and 4'-amino-benzanilide.

Possible diamines of the general formula (II) where n=2 are, for example:

4,4'-diaminoazobenzene, 3,3'-dimethylbenzidine, 4,4'-diamino-benzanilide, 2-(4-aminophenyl)-5-amino-2H-benzotriazole, 3,3'-dichlorobenzidine, 4,4'-diaminobenzophenone, 2-(4-aminophenyl)-5-aminobenzimidazole, 4,4'-diamino-N,N'-diphenylurea, 4,4'-diaminodiphenylamine, 1,2-bis-(4'-aminophenyl)-ethane, 4,4'-diaminodiphenylamine, 1,2-bis-(4'-aminophenyl)-methane, 2,2-bis-(4-aminophenyl)-propane, 1,1-bis-(4-aminophenyl)-cyclohexane, 4,4'-diaminostilbene, 3,3'-dianisidine, 4,4'-diaminodiphenyl sulphide and 2,4-bis[(3'-aminophenylamino)]-6-dimethylamino-triazine.

The coupling is usually carried out at temperatures of between 0° and 50° C., preferably at temperatures between 0° and 30° C., at pH values of between 2 and 10, preferably between 4 and 7. The dyestuffs can be isolated and dried, but they can also be converted into stable, concentrated solutions with suitable solvents.

Such solutions are, for example, aqueous solutions of mineral acids and/or organic acids, for example hydrochloric acid, sulphuric acid, phosphoric acid, formic acid, acetic acid, glycolic acid, lactic acid and methanesulphonic acid.

However, organic solvents, such as, for example, ethylene glycol, diglycol, triglycol, glycerol, ethylglycol monomethyl ether, diglycol monoethyl ether, diglycol monobutyl ether and the like, can also be used as solvents or co-solvents.

The dyestuffs according to the invention dye materials which can be dyed under basic conditions, such as polyacrylonitrile, acid-modified polyester and polyamide, wool and leather, and also cellulose-containing materials, such as cotton and regenerated cellulose fibres, in particular paper, in yellow shades with good fastnesses. The dyestuffs can be employed for dyeing pulp or for the surface-dyeing of paper. They are suitable for sized or unsized types of paper based on bleached or unbleached cellulose of various origins, such as softwood or hardwood sulphite and/or sulphate cellulose.

Dyeing is preferably carried out at pH values of 4 to 8, in particular pH 5 to 7. The dyeing temperature is in general 10° to 50° C., preferably about 20° C.

The auxiliaries and fillers customary in dyeing paper and papermaking can also be used when the dyestuffs according to the invention are employed. The dyestuffs have an excellent absorption capacity in the dyeing of paper. The dyeings on paper obtained with the dyestuffs according to the invention are distinguished by a good fastness to water (fastness to bleeding) and fastness to acid, alkali and alum. The brilliance and clarity of the yellow colour shades are to be emphasized. Furthermore, their combination properties with suitable dyestuffs are very good.

Preparation of the dyestuffs

EXAMPLE 1

7.4 g (0.072 mol) of 2-(4'-aminophenyl)-6-methylbenzothiazole are stirred in 170 ml of water and 20 ml of hydrochloric acid (30% strength by volume). Diazotization is carried out with 17 ml of 30% strength sodium nitrite solution in the customary manner. The mixture is subsequently stirred for 1 hour and excess nitrite is destroyed with amidosulphonic acid. 30.9 g (0.078 mol, 58.9%) of 2-(3-N,N-dimethylaminopropyl)-3-cyano-4,6-diaminopyridine are dissolved in 550 ml of H₂O and the solution is added dropwise to the above diazotization mixture. The pH is brought to 7.5 with aqueous sodium hydroxide solution. The salt-containing dyestuff is filtered off with suction and dried. Yield: 86% of theory.

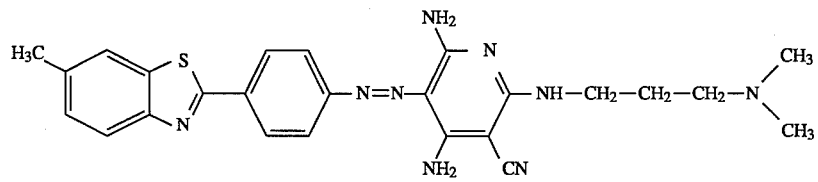

$\lambda_{max}$: 463 nm

EXAMPLES 2–9 of the formula

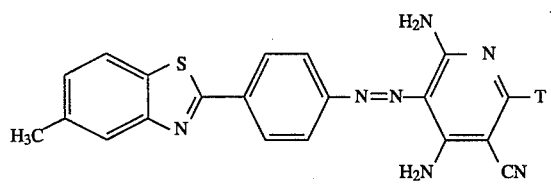

are obtained analogously by replacing the coupling component used in Example 1 by those listed in the following table.

| Example | T | Shade on paper |
|---|---|---|
| 2 | —HN—CH₂—CH₂—CH₂—N(CH₃)—CH₂CH₂—OH | yellow |
| 3 | —HN—CH₂CH₂—N(C₂H₅)₂ | yellow |
| 4 | —HN—CH₂CH₂CH₂—N(C₂H₅)₂ | yellow |
| 5 | —N(piperazine)N—CH₃ | yellow |
| 6 | —HN—C₆H₄—CH₂—N(CH₃)₂ | yellow |
| 7 | —HN—CH₂CH₂—N(piperazine)NH | yellow |
| 8 | —HN—CH₂CH₂CH₂CH₂—NH₂ | yellow |
| 9 | —N[CH₂CH₂CH₂—N(CH₃)₂][CH₂—CH₂CH₂—N(CH₃)₂] | yellow |

EXAMPLE 10

If the procedure is analogous to Example 1, but 2-(4'-aminophenyl)- 6-methyl-7-sulphothiazole is used as the diazo component, the dyestuff of the formula

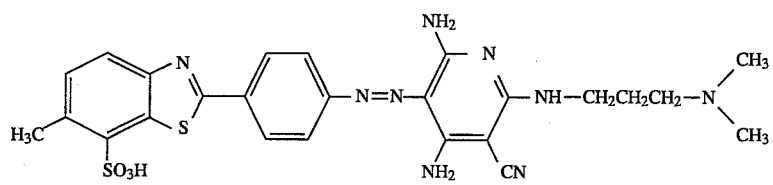

$\lambda_{max}$: 462 nm
Yield: 94% of theory
is obtained.

Yield: 76% of theory

EXAMPLE 11

21.2 g (0.03 mol) of 4,4'-diamino-N,N'-diphenylurea are stirred in 160 ml of water and 16 ml of hydrochloric acid (36% strength by volume).

Diazotization is carried out with 41 ml of 10% strength sodium nitrite solution in the customary manner. The mixture is subsequently stirred for 1 hour and excess nitrite is destroyed with amidosulphonic acid.

30.9 g (0.078 mol 58.9%) of 2-(3-N,N-dimethylaminopropyl)- 3-cyano-4,6-diaminopyridine are dissolved in 550 ml of $H_2O$ and the solution is added dropwise to the above diazotization mixture at 0°–5° C. The pH is brought to 7.5 with aqueous NaOH.

The salt-containing dyestuff is filtered off with suction and dried.

Yield: 82% of theory.

EXAMPLE 13

3.4 g (0.014 mol) of 2-(4-amino-3-methoxyphenyl)-1,2,3-benzotriazole are stirred in 100 ml of water and 4 ml of hydrochloric acid (36% strength by volume), the mixture is cooled to 0° C. with ice and diazotization is carried out by addition of 10 ml of 10% strength sodium nitrite solution. The mixture is subsequently stirred for 1 hour and the excess nitrite is destroyed with amidosulphonic acid. Coupling is carried out to the coupling component used in Example 1 under the conditions stated there. After filtration with suction, the dyestuff is obtained of the formula

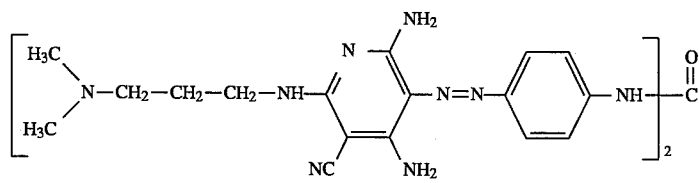

$\lambda_{max}$: 449 nm

EXAMPLE 12

7.7 g (0.03 mol) of 4,4'-diaminobenzanilide are tetrazotized like the tetrazo component of Example 11. Coupling to the coupling component stated in Example 11 gives the dyestuff of the formula

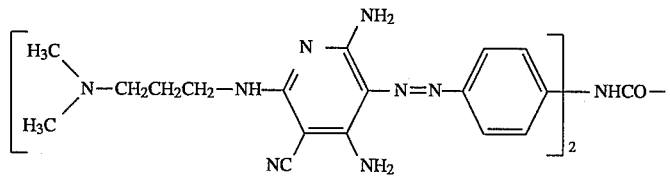

$\lambda_{max}$: 459 nm

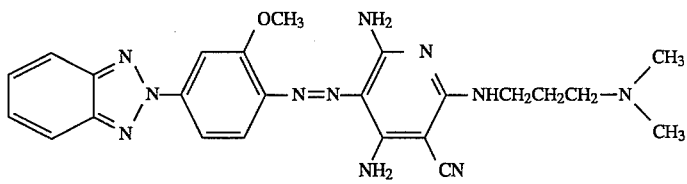

Yield: 85% of theory

EXAMPLE 14

3.1 g (0.01 mol) of a mixture of 2-(4-aminophenyl)-4-methylbenzimidazole and 2-(4-aminophenyl)-5-methylbenzimidazole are diazotized like the diazo component in Example 13. Coupling to the coupling component used in that example gives the dyestuff of the formula

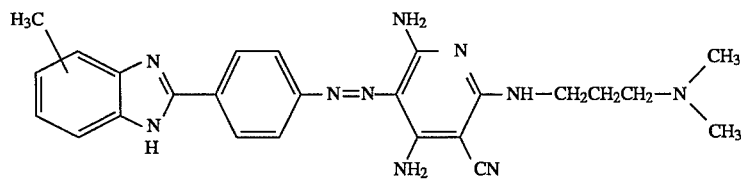

Yield: 87% of theory

What is claimed is:

1. An azo dyestuff of the formula

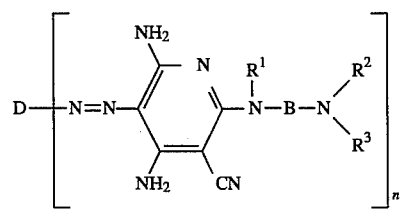

wherein

R¹ represents hydrogen, alkyl or aryl or

R¹ and R², together with B and the two nitrogen atoms to which they are bonded, form an optionally substituted 5- or 6-membered heterocyclic ring, and in this case B represents a direct bond, —CH₂— or —CH₂CH₂—, R² and R³ independently of one another represent hydrogen, alkyl, alkenyl or aralkyl or R² and R³, together with the nitrogen atom to which they are bonded, form an optionally substituted 5- or 6-membered heterocyclic ring, n represents 2 and D represents the radical of a tetrazo component of the formula

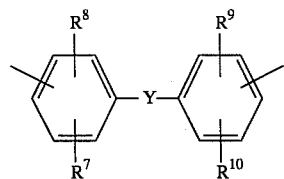

wherein

R⁷–R¹⁰ independently of one another represent hydrogen, SO₃H, C₁–C₄-alkyl, C₁–C₄-alkoxy, chlorine or bromine, B represents C₂–C₅-alkylene which is optionally interrupted by $$-O-,\quad -S-\quad \text{or} \quad -\underset{\underset{R}{|}}{N}-$$

wherein

R represents hydrogen, or represents C₁–C₄-alkyl which is optionally substituted by chlorine, bromine, hydroxyl, cyano, C₁–C₄-alkoxy, amino and mono- and di-C₁–C₄-alkylamino, or represents C₆–C₁₀-aryl which is optionally substituted by fluorine, chlorine, bromine, C₁–C₄-alkyl or C₁–C₄-alkoxy, or B represents a radical of the formula

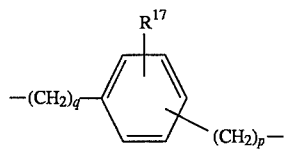

wherein q represents 0, 1, 2 or 3, p represents 1, 2 or 3, (CH₂)ₚ is bonded to the radical NR²R³ and R¹⁷ represents hydrogen, C₁–C₄-alkyl, C₁–C₄-alkoxy, chlorine or bromine, Y represents a direct bond or a bridge member of the formula —CO—NH—, —CO—, —NH—CO—NH—, —CH₂—CH₂—, —CH=CH—, —CH₂—, —C(CH₃)₂—, 5,468,848

15

<image: cyclohexane-like hexagon>,

—O—, —S—, —NH—,

\
 N—C₁-C₄-Alkyl,
/

—N=N—, —NH—CO—CH=CH—CO—NH—,
—NH—CO—CH₂—CH₂—CO—NH— or

<image: triazine ring with N substituents and R¹⁸> wherein

R$^{18}$ represents alkyl or aryl or represents a radical of the formula $$-(N-C_mH_{\overline{2m}})_r N\begin{matrix}R^{20}\\ \\ R^{22}\end{matrix}\begin{matrix}R^{21}\\ \\ \end{matrix}, \quad -O-R^{23} \text{ or } -S-R^{24}$$

wherein m represents 2 or 3, r represents 0 or 1 and

R$^{20}$, R$^{21}$, R$^{22}$, R$^{23}$ and R$^{24}$ independently of one another represent hydrogen, alkyl, alkenyl, aryl, aralkyl or cycloalkyl, or R$^{21}$ and R$^{22}$, together with the N atom to which they are bonded, form a 5- or 6-membered ring.

2. The azo dyestuff according to claim 1, wherein

R$^1$ represents hydrogen, or represents $C_1$–$C_4$-alkyl which is optionally substituted by halogen, hydroxyl, $C_1$–$C_4$-alkoxy, cyano, amino or mono- or di-$C_1$–$C_4$-alkylamino, or represents $C_6$–$C_{10}$-aryl which is optionally substituted by halogen, $C_1$–$C_4$-alkyl or $C_1$–$C_4$-alkoxy, R$^2$ and R$^3$ independently of one another represent hydrogen, or represent $C_1$–$C_4$-alkyl or $C_3$- or $C_4$-alkenyl, in each case optionally substituted by hydroxyl, $C_1$–$C_4$-alkoxy, chlorine, bromine or cyano, or represent benzyl or phenylethyl, which are in each case optionally substituted by hydroxyl, $C_1$–$C_4$-alkoxy, chlorine, bromine, cyano or $C_1$–$C_4$-alkyl, or

16

R$^1$ and R$^2$, together with B and the two nitrogen atoms to which they are bonded, a) in the case where B represents a direct bond, form a hexahydropyridazine ring which is optionally substituted by $C_1$–$C_4$-alkyl, b) in the case where B represents —CH$_2$—, form a hexahydropyrimidine ring which is optionally substituted by $C_1$–$C_4$-alkyl or c) in the case where B represents —CH$_2$CH$_2$—, form a piperazine ring which is optionally substituted by $C_1$–$C_4$-alkyl, or R$^2$ and R$^3$, together with the nitrogen atom to which they are bonded, form a pyrrolidine, piperidine, morpholine, hexahydropyrimidine, hexahydropyridazine or piperazine ring which is optionally substituted by $C_1$–$C_4$-alkyl, the $C_1$–$C_4$-alkyl substituents optionally being substituted by chlorine, bromine, hydroxyl, cyano, amino or mono- or di-$C_1$–$C_4$-alkylamino.

3. The dyestuff of claim 1, wherein

R$^{18}$ represents $C_1$–$C_4$-alkyl which is optionally substituted by hydroxyl, $C_1$–$C_4$-alkoxy, chlorine or bromine, or represents phenyl which is optionally substituted by hydroxyl, $C_1$–$C_4$-alkoxy, chlorine, bromine or $C_1$–$C_4$-alkyl, or represents a radical of the formula $$-(N-C_mH_{\overline{2m}})_rN\begin{matrix}R^{20}\\ \\ R^{22}\end{matrix}\begin{matrix}R^{21}\\ \\ \end{matrix}, \quad -O-R^{23} \text{ or } -S-R^{24}$$

wherein

R$^{20}$, R$^{21}$, R$^{22}$, R$^{23}$ and R$^{24}$ independently of one another represent hydrogen or $C_1$–$C_4$-alkyl or $C_2$–$C_4$-alkenyl, in each case optionally substituted by hydroxyl, halogen, cyano or $C_1$–$C_4$-alkoxy, or represent benzyl, phenylethyl, phenyl, naphthyl or cyclohexyl, in each case optionally substituted by halogen, $C_1$–$C_4$-alkyl, hydroxyl or $C_1$–$C_4$-alkoxy, or R$^{21}$ and R$^{22}$, together with the N atom to which they are bonded, represent pyrrolidone, piperidine, morpholine or piperazine, in each case optionally substituted by $C_1$–$C_4$-alkyl, the external nitrogen atom of which can be alkylated or quaternized by optionally OH— or NH$_2$— substituted $C_1$–$C_4$-alkyl.

4. The dyestuff of claim 1, of the formula

<image: azo dyestuff structure with two pyridine rings bearing NH₂, CN, and NH—B—N(R²)(R³) groups, connected via —N=N— to two phenyl rings (bearing R⁷,R⁸ and R⁹,R¹⁰) linked by Y> wherein

R$^2$ and R$^3$ independently of one another represent $C_1$–$C_4$-alkyl, β- or γ-hydroxy-$C_2$–$C_4$-alkyl or benzyl, or R$^2$ and R$^3$, together with the nitrogen atom to which they are bonded, form a pyrrolidine, morpholine, piperidine or piperazine ring, the terminal nitrogen atom of which can additionally be substituted by β-hydroxyethyl, represents —CH$_2$CH$_2$—, —CH$_2$CH$_2$CH$_2$—, —CH(CH$_3$)CH$_2$— or —CH$_2$CH$_2$CH$_2$CH$_2$—, and Y has the meaning given in claim 1.

5. A process for dyeing naturally occurring and synthetic substances which can be dyed with basic substances which comprises applying thereto at least one dyestuff according to claim 1.

6. A process for dyeing pulp or for the surface of paper which comprises applying thereto at least one dyestuff according to claim 1.

* * * * *

UNITED STATES PATENT AND TRADEMARK OFFICE
CERTIFICATE OF CORRECTION

PATENT NO. : 5,468,848
DATED : November 21, 1995
INVENTOR(S) : Hassenruck, et al.

It is certified that error appears in the above-indentified patent and that said Letters Patent is hereby corrected as shown below:

Col. 16, line 65    Before " represents " insert -- B --

Signed and Sealed this

Twenty-first Day of May, 1996

Attest:

BRUCE LEHMAN

*Attesting Officer*          *Commissioner of Patents and Trademarks*